Aug. 9, 1966  A. O. HUNGERFORD ETAL  3,265,556
FIBER REINFORCED PLASTIC PANEL AND METHOD OF MAKING SAME
Filed Oct. 20, 1961
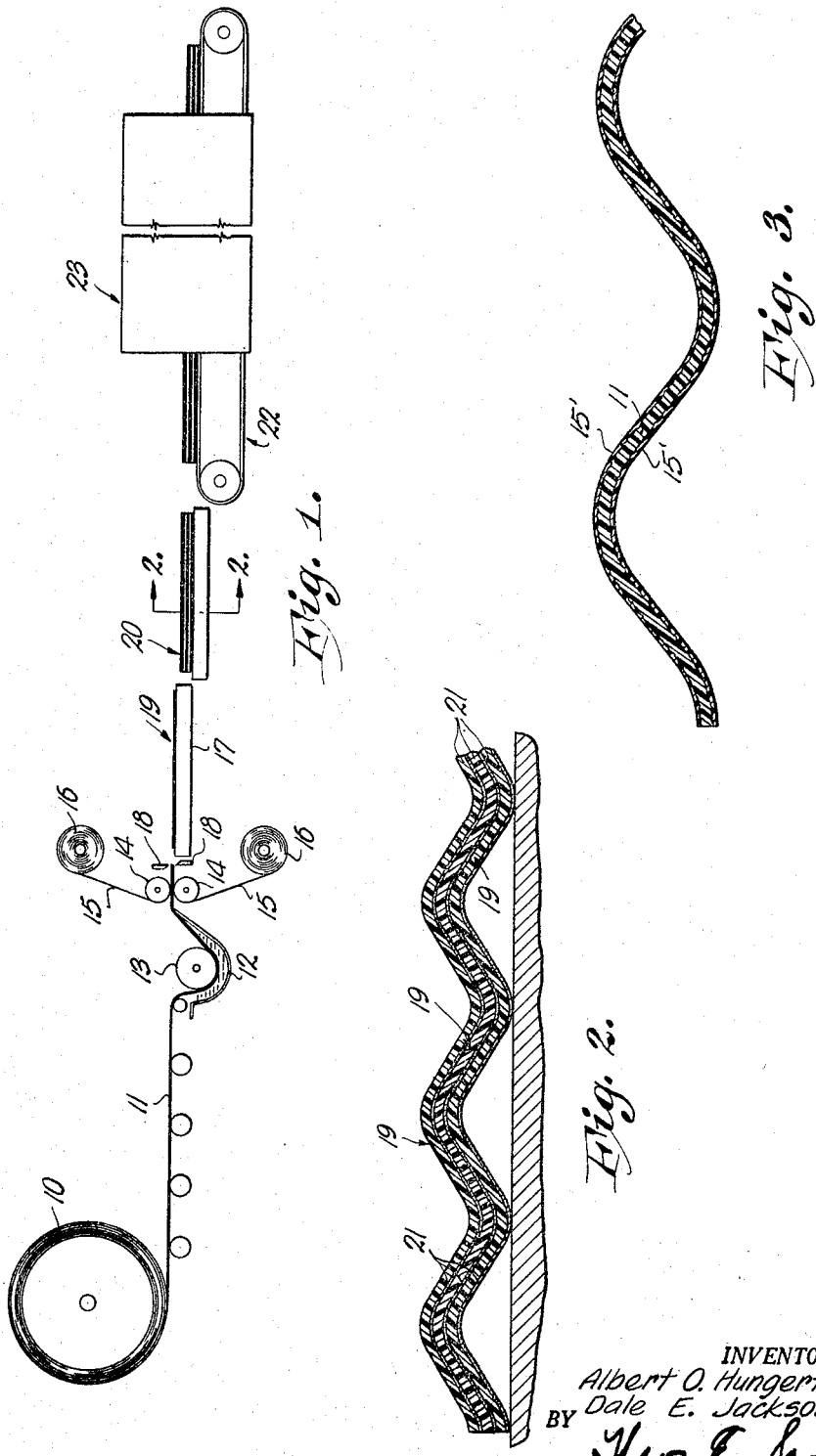
INVENTORS.
Albert O. Hungerford
BY Dale E. Jackson
ATTORNEY.

United States Patent Office 3,265,556
Patented August 9, 1966

3,265,556
FIBER REINFORCED PLASTIC PANEL AND METHOD OF MAKING SAME
Albert O. Hungerford, Kansas City, Mo., and Dale E. Jackson, Prairie Village, Kans., assignors to Butler Manufacturing Company, Kansas City, Mo., a corporation of Missouri
Filed Oct. 20, 1961, Ser. No. 146,479
5 Claims. (Cl. 161—189)

This invention relates to composite panels and sheets composed largely of synthetic resins, and refers more particularly to a fiber reinforced panel composed of such resins, and the method of making same, which embodies as the major component thereof the relatively low cost polymerizable resins heretofore used as standard compositions in such panels, but in which the panel is provided with wrinkle free exposed surfaces provided by surface layers permanently bonded to the article, and which serve to enhance the corrosion resistance and useful life of such panels far beyond present capabilities.

In a more specific aspect, the invention deals with reinforced thermosetting resin panels to be used for various structural purposes such as skylights, partitions, awnings, canopies, wall and ceiling elements, and to the method of manufacturing same.

In recent years, fiber reinforced plastic panels, principally in the form of corrugated or fluted translucent sheets, have become increasingly popular for the uses set forth above. The present invention has for one of its main objects the production of a panel directed to such uses, yet which is provided with surface layers on its major faces which maintain their continuity almost indefinitely regardless of length of exposure to weather, sun, chemical vapors or temperatures up to at least 250° F. One of the most advantageous features of the invention is that these properties are achieved for the panel while still employing as major components of the panel the conventional resins presently recognized in the art as the most efficient and economical, and without requiring the alteration of standard production techniques.

A further object of the invention is to provide a panel of the character described in which the major faces of the panel are unique in their glossy smooth character. The surfaces are completely wrinkle free, and are unique in their ability to withstand delamination or separation from the panel even under the most stringent conditions of handling and exposure. The surface layers provided by the present invention impart to the appearance of the panel a sheen and gloss which maintains its character over years of hard use, and at the same time the strength of the panel is retained at its original design value through the protection afforded the stress bearing components of the panel from decomposition and destruction. It is a feature of the invention in this respect that panels having at least one surface formed according to the present invention can be highly useful in the construction of tanks or bins used for the storage of various materials. The high degree of strength and corrosion resistance of the panel, and the extreme smoothness and glossiness of its surface contribute materially to the success of the panel in this regard. The character of the surface is particularly useful in assisting in clean out of materials which otherwise have a tendency to "hang up" on the interior surfaces of the container.

Still another object of the invention is to provide a panel of the character described in which the protective surface layers are so applied as to make possible the elimination in the manufacture of the panels the conventional cellophane films which have heretofore been utilized as mold releases. In manufacturing techniques presently in use, it is standard practice to encase the web of plastic and fiber during forming and cure in an envelope of film, for example, cellophane, which at the completion of the manufacturing operation is stripped from the panels. This film becomes a waste product incapable of reuse. Through our invention the surface forming layer of the panel serves in and of itself during the processing of the panels as the mold release, obviating the necessity for employing a separate mold release film.

A further and highly important object of the invention is to provide a method for manufacturing panels of the character described which permits relatively rapid, assembly line production of the panels while still obtaining a permanently bonded surface layer which is free from wrinkles. The terminology "permanently bonded" means bond of sufficient strength as to prevent separation of the surface layer from the underbody or substrate without either breaking the surface layer or removing part, such as the underlying reinforcing fibers, of the substrate.

Still another object of the invention is to provide a method of manufacture resulting in panels having a surface layer of the character described and in which the panel is contact molded (that is, at pressures from 0–10 p.s.i.) and during cure subjected to relatively high temperatures in the range of 150°–300° F.

A further object of the invention is to provide a novel film-like structure which is uniquely capable of being utilized to form the permanently bonded surface layer of the panel.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 1 is a diagrammatic side elevational view showing generally the steps involved in the manufacturing process for the panels;

FIG. 2 is a fragmentary cross sectional view illustrating the composite uncured structure sandwiched between successive mold or caul plates; and FIG. 3 is a greatly enlarged fragmentary cross section through a typical panel according to the invention.

In its broadest aspects our invention embraces the formation of a fiber reinforced resin panel which includes a moisture impermeable, corrosion resistant, extremely tough surface layer which is permanently bonded to the panel and remains an integral part thereof throughout the life of the panel. The surface layer is distinguished by its uninterrupted bond with the underlying resin body and its extremely smooth, glossy exposed face. In achieving our objective we place upon at least one surface of a sheet-like web, made up of a collection of reinforcing fibers and resin, a thin preformed film-like body of polyvinyl fluoride while the resin is still in liquid state, that is, before polymerization of the resin has progressed any appreciable amount. The film-like body has a web contacting face which has been treated to promote adhesion with the resin as the latter is cured, and further is laterally heat shrinkable to substantially the same extent as the potential, lateral shrinkage of the resin impregnated web during polymerization of the resin under the temperatures utilized in the curing of the panel. The composite uncured structure is then subjected to heat while maintaining the film-like body in firm but low pressure contact with the web throughout substantially the entire area covered by the film-like body. During the cure the resin polymerizes and permanently bonds to the film-like body and at the same time, the film-like body contracts to the same extent as the resin impregnated web, thus preventing the formation of any wrinkles or any irregularities in the surface layer, and more importantly, insuring of continuous bonding of all points on the surface layer with the underlying substrate of resin and fiber.

Referring now to the drawing, in FIG. 1 we have shown in schematic form a typical assembly line process for carrying out the method of the invention. Reference numeral 10 represents a bulk roll from which is unwound a continuous web 11 of glass or other reinforcing fibers. As known by those skilled in the art the web 11 is composed of loosely interconnected or matted fibers and is highly porous, embodying myriad interstitial air spaces between the fibers. Preferably the web has an uncompressed air thickness of between approximately .048 and .139 inch, the fibers having an average diameter on the order of 10 microns and length of 2 to 3 inches, and the density weight of the web being between ¾ and 3 ounces per square foot. The width of the web is determined by the width to be given the final product and can be selected in accordance therewith.

As the web is unwound it is passed into an impregnating trough 12 where it is immersed by guide roller 13 in a body of liquid resin to thoroughly impregnate same. It is a feature of our invention that we are able to employ, while still obtaining the surface layer of the character described above, the commercially available unsaturated polyester resins which have been accepted as standard in this type of product. We prefer unsaturated polyester resins modified with vinyl aromatic (styrene) or acrylic and vinyl aromatic monomers. The unsaturated polyesters are capable of cross linking through their reactive double bonds and will also cross link through their monomers. We also have used a chlorinated polyester of the self-extinguishing type as exemplified by Hetron 93LS supplied by Hooker Electrochemical Company. If desired, various catalysts may be employed to aid in curing the resin, usually catalysts of the organic peroxide type such as methyl ethyl ketone peroxide, benzoyl peroxide, and tertiary butyl perbenzoate. We prefer for speed in manufacturing a resin composition which will polymerize to a hard, strong and solid mass within 20–60 minutes when subjected to temperatures on the order from 150°–300° F.

It will be understood that pigments or dyes, relatively light fast and unaffected by the catalysts, may be included in the resin trough to impart the desired tint or color to the final product.

Once the resin impregnated web has left the trough 12 it is fed directly into the nip of a pair of squeeze rolls 14 which serve not only to squeeze excess resin from the impregnated web, but also to firmly contact with the opposite faces of the advancing, but still uncured web, a continuous layer in the form of a preformed thin (0.5 to 5 mils) film 15 of polyvinyl fluoride known more familiarly under the Du Pont Company trademark "TEDLAR." The film is drawn in continuous fashion from bulk rolls 16, passing from each roll into the nip of the squeeze rolls where it is merged with the confronting face of the impregnated web.

Due to its extreme thinness and its chemical composition, the characteristics of the layer forming film 15 are of critical importance in our invention. The film body must be substantially uniform in thickness and have a potential lateral shrinkability when subjected to the resin curing temperatures and during the period of cure, substantially equal to the lateral shrinkability of the web. By utilizing a film with controlled shrinkage characteristics of the character described, the area of the film body will contract with the contraction of the web during the cure, thus avoiding any wrinkling in the film body and assuring that the web contacting face of the film body will at all times be in bonding contact with the underlying web. To promote adhesion between the film body and the web, the web contacting face of the film is provided with a bond-promoting surface, such as by incorporating in said face during manufacture of the film, microscopic irregularities into which the resin will reach, or alternatively, forming a thin coating on said face of titanium (IV) oxide by treatment with alkyltitanates and subsequent controlled hydrolysis thereof. Polyvinyl fluoride films provided with the shrinkage characteristics set forth and with a suitable surface treatment are readily available from the manufacturer, and the treatment processes, as such, form no part of the present invention, so further detail is believed unnecessary.

In the particular method and panel composition here being utilized as illustrating the invention, the film bodies are 1 mil in thickness and the shrinkage range desired at various temperatures expressed in percent of the original length is as follows:

| Temperature, degrees F. | Percent shrinkage |
| --- | --- |
| 130 | 0 |
| 140 | 0.5 |
| 150 | 0.5–1.5 |
| 160 | 1–2 |
| 200 | 3–4 |

Shrinkage in the above table was measured by suspending from one end a 1-inch wide strip of 1-mil film in an oven, the other end being weighted by a 12-gram weight. It is desirable that the shrinkage occurring up to approximately 140° F. be substantially small, since we desire the major shrinkage to occur during the actual curing operation, that is, at the same time that the resin in the web is experiencing its shrinkage. While not an especially critical factor in the use of extremely thick films such as 4 mil, or on flat panels, nevertheless, with thinner films, which have less stiffness, and in the manufacture of fluted or corrugated panels, it is more important that the initial contact of the mold or caul plate with the film produce little or no shrinkage. During the continuous manufacturing operation these plates may, because of rapid reuse, be at temperatures as high as 140° F., and unless the film shrinkage is held to a minimum in the low end of the range it may be difficult, if not impossible, to obtain the desired smoothness in and continuous bond of the surface layer to the web in the corrugated configuration.

Subsequent to the contacting of the film bodies with the web through the squeeze roll the laminated wet lay-up is passed to the conveyor or table 17 through the shear blades 18 and is cut to the desired lengths 19. While on the surface 17 any air bubbles or creases in the lay-up are removed and this can be done by manually wiping the laminate with wire squeegees in a direction to expel the air at the edges of the lay-up and smooth out the films.

The lengths of uncured lay-up are now placed in stacked arrangement between upper and lower lightweight caul plates with each length between a pair of the plates to form a stack assembly 20. In FIG. 2 the caul plates, which may be thin sheets of aluminum, are indicated at 21. These plates impart to the wet lay-up the final configuration desired, and obviously may be flat or in any configuration, other than the sinuous shape illustrated, that is desired.

The stack assembly 20 has been placed on an oven conveyor 22 and passed through the curing oven 23. While the speed of the oven conveyor and the temperatures in the oven may be varied according to the particular resins employed, the range in our process is from a low of 150° F. to a high of 300° F. through a period of from 15 minutes to 60 minutes in the oven. As a particular example, using a web of the characteristics set forth earlier with an acrylic-modified polyester and with 1-mil polyvinyl fluoride film, the temperature ranged from 200° F. to 300° F. with a curing time of 30 minutes.

Pressure may be applied in known fashion to the lay-up during the cure, but only sufficient pressure is required as to insure that the film material will be maintained in continuous contact with the web during the cure so that it will conform closely to the web. Care must be taken, however, to maintain the edges of the lay-up free from lateral restraint so that the desired shrinkage of the film bodies can take place. The maximum pressure should be no more than 10 p.s.i., and preferably is much less, ranging from 0 to 5 p.s.i.

When the stack emerges from the curing oven, the caul plates are separated from the cured articles and the latter are now ready for use except as for such edge trimming as may be required to neaten the appearance and provide uniform edges.

FIG. 3 represents a transverse cross section through a portion of a typical panel constructed in accordance with the invention. While the illustrated panel has a corrugated cross-sectional configuratian, this has been selected for purposes of illustration alone. The invention, as previously mentioned, is applicable as well to flat panels or to corrugations and forms other than the sinuous configurations shown.

The finished panel is characterized by the continuous wrinkle-free opposed surface layers 15' of polyvinyl fluoride which closely conform and are permanently bonded to the polymerized reinforced resin underbody 11'. The surface layers are uniform, both in the valleys and on the ridges of the corrugation, and provide complete protection of the relatively vulnerable polyester underbody from chemical vapors, moisture and other destructive factors. The bond between the surface layers and underbody or substrate is truly permanent and delamination of the surface layers is impossible without breakage of the panel or breaking away with the film a part of the polymerized resin underbody. The surface layers also serve to prevent any separation of the reinforcing fibers from their matrix of resin.

While we have shown a method in which the forming of the resin-fiber web is through impregnation of a porous mat of fibers, it will be understood that other methods of obtaining the web may also be used, for example, the method employed in Shorts Patent 2,784,763. The application of the surface layers may also be accomplished in a continuous fashion in the manner disclosed in the aforesaid Shorts patent. Reinforcing materials other than glass fiber may be used, for example, various organic and inorganic fibers compatible with the resin, or particulate fillers may be substituted for the reinforcing fiber arrangement.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A fiber reinforced composite plastic panel comprising a main body in the form of a thin sheet composed of a polymerized unsaturated polyester resin having interspersed therethrough a collection of reinforcing fibers, and a surface layer directly and permanently bonded to at least one face of the main body by the resin in the body adjacent said one face, said surface layer composed of a film of polyvinyl fluoride and the bond between the film and resin having been achieved during polymerization of the resin.

2. A fiber reinforced composite panel as in claim 1, wherein said sheet has a thickness of between .035 and .125 inch., and said surface layer has a thickness of between 1 and 3 mils.

3. A fiber reinforced panel as in claim 1, wherein said resin comprises a vinyl aromatic modified polyester.

4. A fiber reinforced panel as in claim 1, wherein said resin comprises an acrylic modified polyester.

5. A fiber reinforced panel as in claim 1, wherein said resin comprises a chlorinated polyester self-extinguishing resin.

References Cited by the Examiner

UNITED STATES PATENTS

| | | | |
|---|---|---|---|
| Re. 24,804 | 3/1960 | Shorts | 156—85 |
| 2,774,702 | 12/1956 | Smith | 161—189 |
| 2,774,704 | 12/1956 | Smith | 161—189 |
| 2,949,394 | 8/1960 | Rodman | 156—85 |
| 3,018,267 | 1/1962 | Steckler et al. | 161—195 XR |
| 3,044,913 | 7/1962 | Lundberg | 161—195 XR |

EARL M. BERGERT, *Primary Examiner.*

R. I. SMITH, H. ANSHER, *Assistant Examiners.*

Dedication 3,265,556.—*Albert O. Hungerford*, Kansas City, Mo., and *Dale E. Jackson*, Prairie Village, Kans. FIBER REINFORCED PLASTIC PANEL AND METHOD OF MAKING SAME. Patent dated Aug. 9, 1966. Dedication filed Apr. 24, 1968, by the assignee, *E. I. du Pont de Nemours and Company*.

Hereby dedicates to the Public the remaining term of said patent.

[*Official Gazette August 13, 1968.*]